United States Patent
Cook et al.

(10) Patent No.: US 11,128,345 B2
(45) Date of Patent: Sep. 21, 2021

(54) CONTACTLESS INTERFACE FOR MM-WAVE NEAR FIELD COMMUNICATION

(71) Applicant: TEXAS INSTRUMENTS INCORPORATED, Dallas, TX (US)

(72) Inventors: Benjamin Stassen Cook, Los Gatos, CA (US); Swaminathan Sankaran, Allen, TX (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 0 days.

(21) Appl. No.: 16/773,557

(22) Filed: Jan. 27, 2020

(65) Prior Publication Data
US 2020/0162127 A1    May 21, 2020

Related U.S. Application Data

(62) Division of application No. 15/146,965, filed on May 5, 2016, now Pat. No. 10,547,350.

(51) Int. Cl.
| | |
|---|---|
| *H04B 5/00* | (2006.01) |
| *H01P 5/00* | (2006.01) |
| *H01P 5/107* | (2006.01) |
| *H01P 3/12* | (2006.01) |
| *H01P 3/16* | (2006.01) |
| *H01Q 7/00* | (2006.01) |

(52) U.S. Cl.
CPC ........... *H04B 5/0031* (2013.01); *H01P 5/107* (2013.01); *H04B 5/0075* (2013.01); *H01P 3/122* (2013.01); *H01P 3/16* (2013.01); *H01Q 7/00* (2013.01)

(58) Field of Classification Search
CPC ... H01P 5/10; H01P 5/107; H01P 5/02; H04B 5/00
See application file for complete search history.

(56) References Cited

U.S. PATENT DOCUMENTS

| | | |
|---|---|---|
| 2,649,576 A | 8/1953 | Lewis |
| 5,629,266 A | 5/1997 | Lithgow et al. |
| 5,634,822 A | 6/1997 | Gunell |
| 6,469,596 B2 | 10/2002 | Hull et al. |

(Continued)

FOREIGN PATENT DOCUMENTS

| | | |
|---|---|---|
| CN | 102592166 A | 7/2012 |
| CN | 203941311 U | 11/2014 |

(Continued)

OTHER PUBLICATIONS

Extended European Search Report for 17793406.4 dated Sep. 2, 2019.

(Continued)

*Primary Examiner* — Dean O Takaoka
(74) *Attorney, Agent, or Firm* — Michael A. Davis, Jr.; Charles A. Brill; Frank D. Cimino

(57) ABSTRACT

A system is provided in which a first waveguide has a first resonator coupled to an end of the first waveguide. A second waveguide has a second resonator coupled to the second waveguide. The first resonator is spaced apart from the second resonator by a gap distance. Transmission of a signal propagated by the first waveguide across the gap to the second waveguide is enhanced by a confined near field mode magnetic field produced by the first resonator in response to the propagating wave that is coupled to the second resonator.

4 Claims, 16 Drawing Sheets

(56) References Cited

U.S. PATENT DOCUMENTS

| | | |
|---|---|---|
| 6,518,853 B1 | 2/2003 | O'Connell |
| 8,493,276 B2 | 7/2013 | Greegor et al. |
| 9,306,263 B2 | 4/2016 | Herbsommer et al. |
| 9,537,195 B2 | 1/2017 | Sun et al. |
| 9,577,477 B2 | 2/2017 | Fujiyama et al. |
| 9,590,699 B1 | 3/2017 | Sankaran et al. |
| 10,008,756 B2 | 6/2018 | Harada et al. |
| 10,027,376 B2 | 7/2018 | Sankaran et al. |
| 10,171,578 B1 | 1/2019 | Cook et al. |
| 10,389,410 B2 | 8/2019 | Brooks et al. |
| 2002/0132601 A1 | 9/2002 | Cho et al. |
| 2007/0279150 A1 | 12/2007 | Vangala et al. |
| 2015/0222004 A1 | 8/2015 | Sankaran et al. |
| 2015/0270595 A1 | 9/2015 | Okada |
| 2015/0288057 A1 | 10/2015 | Shimura et al. |
| 2016/0036110 A1 | 2/2016 | Cheng et al. |
| 2017/0186710 A1 | 6/2017 | Yoon et al. |

FOREIGN PATENT DOCUMENTS

| | | |
|---|---|---|
| CN | 104900950 A | 9/2015 |
| EP | 1425815 | 9/2004 |
| EP | 2360776 | 8/2011 |
| EP | 2573951 | 8/2011 |
| EP | 2833512 A1 | 2/2015 |
| FR | 2827721 | 1/2003 |
| WO | 2015000376 | 1/2015 |

OTHER PUBLICATIONS

European Search Report for 17793406.4 dated Apr. 8, 2019.
International Search Report in corresponding PCT Application No. PCT/US2017/031196, dated Aug. 24, 2017 (3 pages).
Office Action for Chinese Patent Application No. 201780027543.4 dated Dec. 23, 2020, 9 pages.
CN203941311U, English Machine Translation, 15 pages.
CN104900950A, English Machine Translation, 13 pages.
CN102592166A, English Machine Translation, 67 pages.

CONTACTLESS INTERFACE FOR MM-WAVE NEAR FIELD COMMUNICATION

CROSS-REFERENCE TO RELATED APPLICATION

This application is a divisional of U.S. patent application Ser. No. 15/146,965 filed May 5, 2016, the entirety of which is incorporated herein by reference.

BACKGROUND

This relates generally to near field communication (NFC) in place of physical/ohmic contacts for communication among system modules.

In electromagnetic and communications engineering, the term waveguide may refer to any linear structure that conveys electromagnetic waves between its endpoints. The original and most common meaning is a hollow metal pipe used to carry radio waves. This type of waveguide is used as a transmission medium for such purposes as connecting microwave transmitters and receivers to their antennas, in equipment such as microwave ovens, radar sets, satellite communications, and microwave radio links.

A dielectric waveguide employs a solid dielectric core rather than a hollow pipe. A dielectric is an electrical insulator that can be polarized by an applied electric field. When a dielectric is placed in an electric field, electric charges do not flow through the material as they do in a conductor, but only slightly shift from their average equilibrium positions causing dielectric polarization. Because of dielectric polarization, positive charges are displaced toward the field and negative charges shift in the opposite direction. This creates an internal electric field which reduces the overall field within the dielectric itself. If a dielectric is composed of weakly bonded molecules, those molecules not only become polarized, but also reorient so that their symmetry axis aligns to the field. While the term "insulator" implies low electrical conduction, "dielectric" is typically used to describe materials with a high polarizability; which is expressed by a number called the dielectric constant (ck) and/or by a number called the relative permittivity ($\varepsilon r$). The term insulator is generally used to indicate electrical obstruction while the term dielectric is used to indicate the energy storing capacity of the material by means of polarization.

The electromagnetic waves in a metal-pipe waveguide may be imagined as travelling down the guide in a zig-zag path, being repeatedly reflected between opposite walls of the guide. For the particular case of a rectangular waveguide, it is possible to base an exact analysis on this view. Propagation in a dielectric waveguide may be viewed in the same way, with the waves confined to the dielectric by total internal reflection at its surface.

Near Field Communication (NFC) is a wireless technology allowing two devices to communicate over a short distance of approximately 10 cm or less. Various protocols using NFC have been standardized internationally within NFC Forum specifications and defined in ISO/IEC 18092, ECMA-340, and ISO 14443, for example. NFC allows a mobile device to interact with a subscriber's immediate environment. With close-range contactless technology, mobile devices may be used as credit cards, to access public transportation, to access secured locations, and many more applications. Contactless systems are commonly used as access control ID's (e.g. employee badges), as well as payment systems for public transportation etc. More recently, credit cards are beginning to include NFC capability.

DETAILED DESCRIPTION OF EXAMPLE EMBODIMENTS

Figure 1:
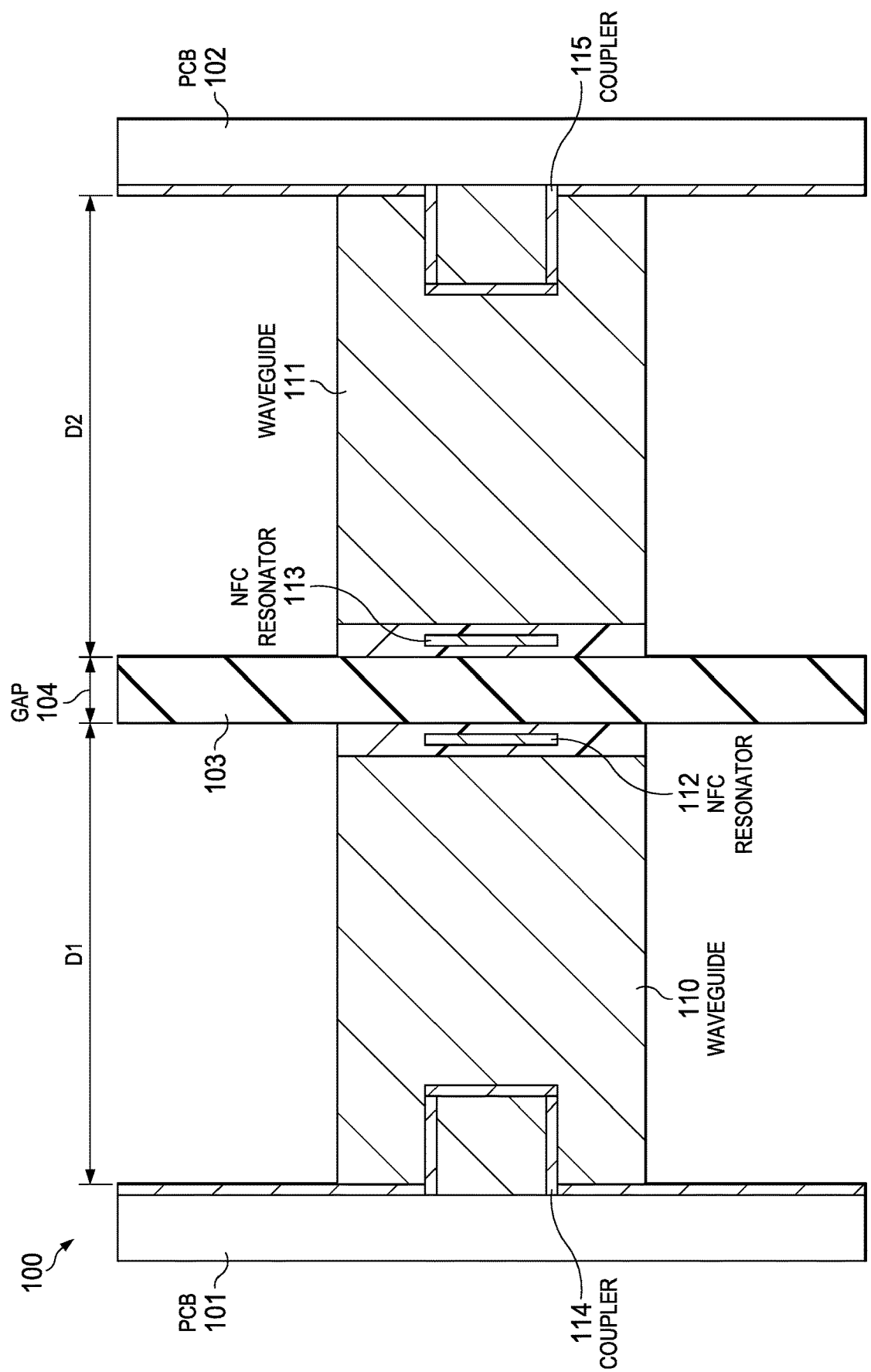
FIGS. 1-2 are side views of a system illustrating near field coupling across a gap between two waveguides with the aid of resonators.

Like elements in the drawings are denoted by like reference numerals for consistency.

As frequencies in electronic components and systems increase, the wavelength decreases in a corresponding manner. For example, many computer processors now operate in the gigahertz realm. As operating frequencies increase to sub-terahertz, the wavelengths become short enough that signal lines that exceed a short distance may act as an antenna and signal radiation may occur. For example, in a material with a low dielectric constant of 3, such as a printed circuit board, a 100 GHz signal will have a wavelength of approximately 1.7 mm. Thus, a signal line that is only 1.7 mm in length may act as a full wave antenna and radiate a significant percentage of the signal energy in the material.

Waves in open space propagate in all directions, as spherical waves. In this way, in the far-field regime, they lose their power proportionally to the square of the distance; that is, at a distance R from the source, the power is the source power divided by $R^2$. Such random wave propagation may also result in interference to other systems that are located nearby and be in violation of emission limits set by standard bodies such as FCC and IEC.

A wave guide may be used to transport high frequency signals over relatively long distances. The waveguide confines the wave to propagation in one dimension, so that under ideal conditions the wave loses no power while propagating. Electromagnetic wave propagation along the axis of the waveguide is described by the wave equation, which is derived from Maxwell's equations, and where the wavelength depends upon the structure of the waveguide, and the material within it (air, plastic, vacuum, etc.), as well as on the frequency of the wave. Commonly-used waveguides are only of a few categories. The most common kind of waveguide is one that has a rectangular cross-section, one that is usually not square. It is common for the long side of this cross-section to be twice as long as its short side. These are useful for carrying electromagnetic waves that are horizontally or vertically polarized.

For the exceedingly small wavelengths encountered for sub-THz radio frequency (RF) signals, dielectric waveguides perform well and are much less expensive to fabricate than hollow metal waveguides. Furthermore, a metallic waveguide has a frequency cutoff determined by the size of the waveguide. Below the cutoff frequency there is no propagation of the electromagnetic field. Dielectric waveguides have a wider range of operation without a fixed cutoff point.

Using NFC coupling with waveguides to distribute signals between various modules may provide a low cost interconnect solution. Embodiments may provide a way to interface removable system modules without using physical/ohmic contacts.

Figure 2:
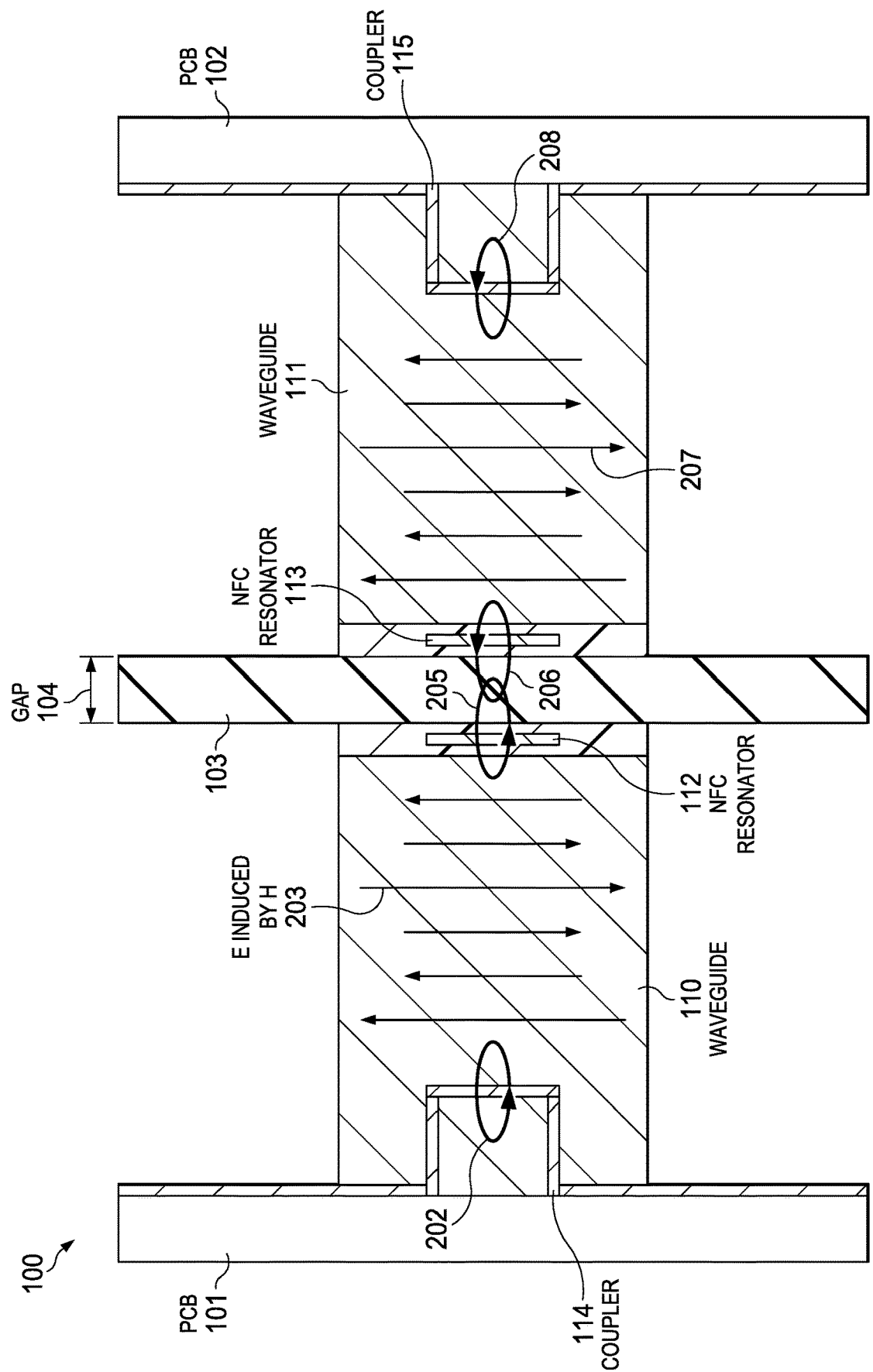

FIGS. 1-2 are side views of a portion of an example system 100 illustrating near field communication (NFC) across a gap 104 between two waveguides 110, 111 with the aid of resonators 112, 113. In this example, substrate 101 may contain or be coupled to high frequency circuitry that is configured to generate a radio frequency (RF) signal. In some embodiments, the RF signal may have a fundamental frequency in the range of approximately 10-200 GHz, for example. The substrate 101 may be a printed circuit board (PCB) implemented using any commonly used or later developed material used for electronic systems and packages, such as: fiberglass, plastic, silicon, ceramic, Plexiglas, etc.

A waveguide 110 may be located adjacent substrate 101 and extend for a distance D1 away from substrate 101. As described above, waveguide 110 may be a metallic waveguide, a dielectric waveguide, a dielectric filled metallic waveguide, or other known or later developed transmission media for propagation of RF signals. A coupler 114 may be fabricated on substrate 101 for launching the RF signal into waveguide 110. Coupler 114 may be a shorted loop of a microstrip, for example, that is connected to the circuitry that generates the RF signal. In another embodiment, coupler 114 may be a differential loop in which a microstrip on each side is fed differentially. Other embodiments may use other known or later developed structures for launching an RF signal into waveguide 110.

Similarly, another substrate 102 may contain or be coupled to high frequency circuitry that is configured to receive an RF signal. In some embodiments, the RF signal may have a fundamental frequency in the range of approximately 10-200 GHz, for example. The substrate 102 may be a PCB implemented using any commonly used or later developed material used for electronic systems and packages, such as: fiberglass, plastic, silicon, ceramic, Plexiglas, etc.

A waveguide 111 may be located adjacent substrate 102 and extend for a distance D2 away from substrate 102. As described above, waveguide 111 may be a metallic waveguide, a dielectric waveguide, a dielectric filled metallic waveguide, or other known or later developed transmission media for propagation of RF signals. A coupler 115 may be fabricated on substrate 102 for receiving the RF signal from waveguide 110. Coupler 115 may be a shorted loop of a microstrip, for example, that is connected to the circuitry that receives the RF signal. In another embodiment, coupler 114 may be a differential loop in which a microstrip on each side is fed differentially. Other embodiments may use other known or later developed structures for receiving an RF signal from waveguide 111.

A resonator 112 may be fabricated on the end of waveguide 110 opposite from coupler 114, as described in more detail below. Similarly, a resonator 113 may be fabricated on an end of waveguide 111 opposite coupler 115. In this example, the end of waveguide 110 containing resonator 112 is spaced apart from the end of waveguide 111 containing resonator 113 by a gap distance 104. The gap may simply be a space between the two ends and be filled with air, for example. In some embodiments, there may be a solid material 103 filling all or a portion of gap 104. Solid material 103 may be a dielectric or insulating material, such as plastic, glass, fiberglass, ceramic, Plexiglas, etc.

Distance D1, D2 may be relatively short for applications in which the substrates are packaged within system modules that are located close together, examples of which are described below. In other applications, D1 and/or D2 may be long when substrate 101 is located a longer distance from substrate 102. For example, substrate 101 may be separated from substrate 102 by several inches, several feet, or even hundreds of feet or more. Waveguides 110, 111 allow signal confinement and propagation with low loss over long distances.

FIG. 2 illustrates the operation of NFC in system 100. Launch structure 114 may be a shorted loop of microstrip or a differential loop, for example, that creates a magnetic field 202 in waveguide 110 to match the TE01 mode H-field of waveguide 110. This allows for transitioning from a microstrip propagation mode to a waveguide propagation mode. H-field 202 then induces a propagating E-field 203 according to waveguide propagation principles. When propagating E-field 203 interacts with resonator 112, a current is generated that produces confined near field mode magnetic field 205. Confined near field mode magnetic field 205 is essentially a non-radiating evanescent field that magnetically couples with resonator 113 across gap 104 to produce an induced current in resonator 113. The induced current in resonator 113 then creates a magnetic field 206 that induces propagating E-field 207 in waveguide 111. When E-field 207 reaches coupler 115, a magnetic field 208 generates an RF signal that may then be routed to receiver circuitry on substrate 102.

In this manner, an RF signal may be transferred from circuitry on substrate 101 to circuitry on substrate 102 via waveguides 110, 111 across gap 104 with minimal loss or radiation to adjacent systems/components due to a confined near field mode magnetic field produced by resonator at the end of each waveguide adjacent the gap.

Figure 3A:
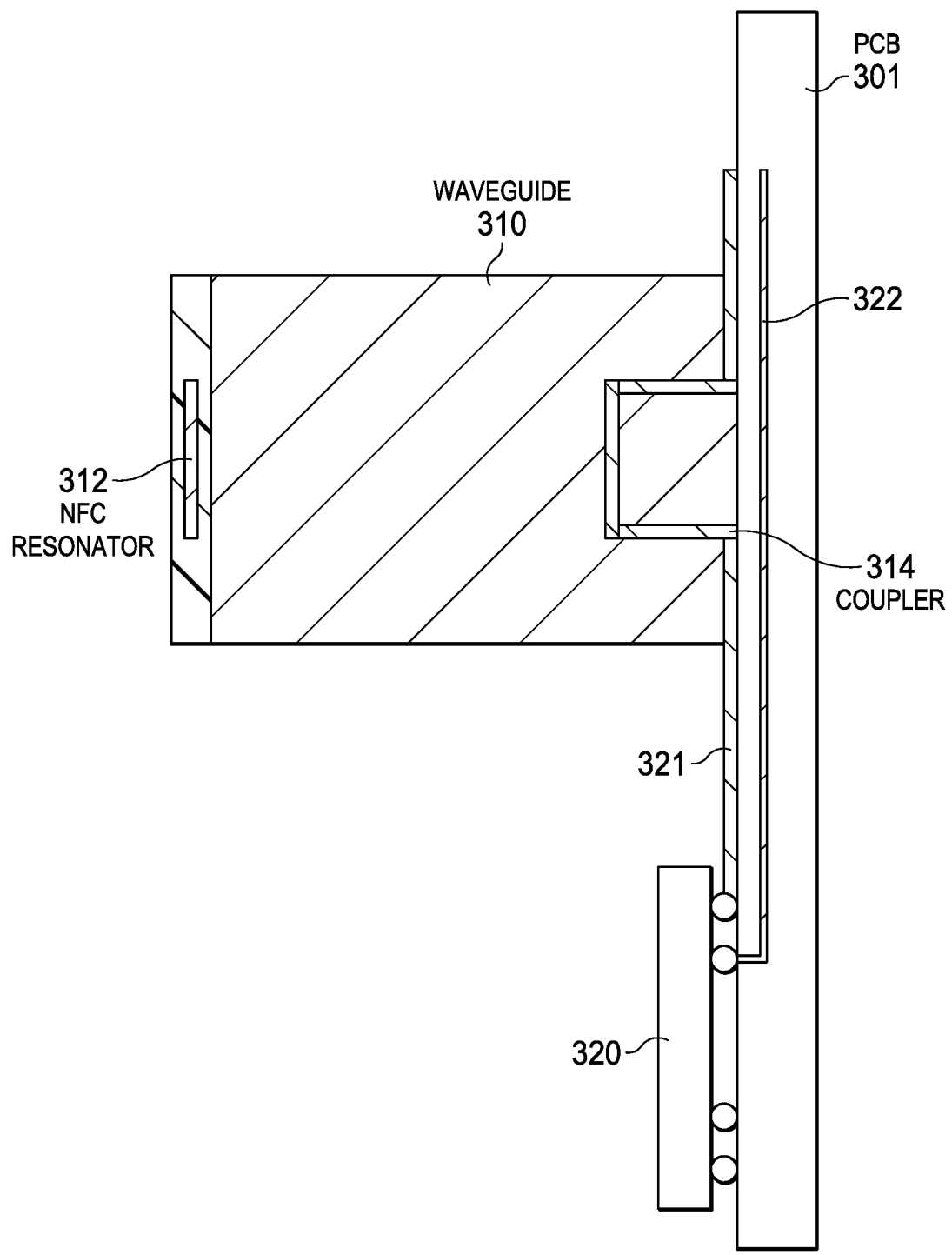
FIGS. 3A-3C, 4 illustrate an exemplary waveguide coupler and resonator placed in the waveguides of FIGS. 1-2 in more detail.
Figure 3B:
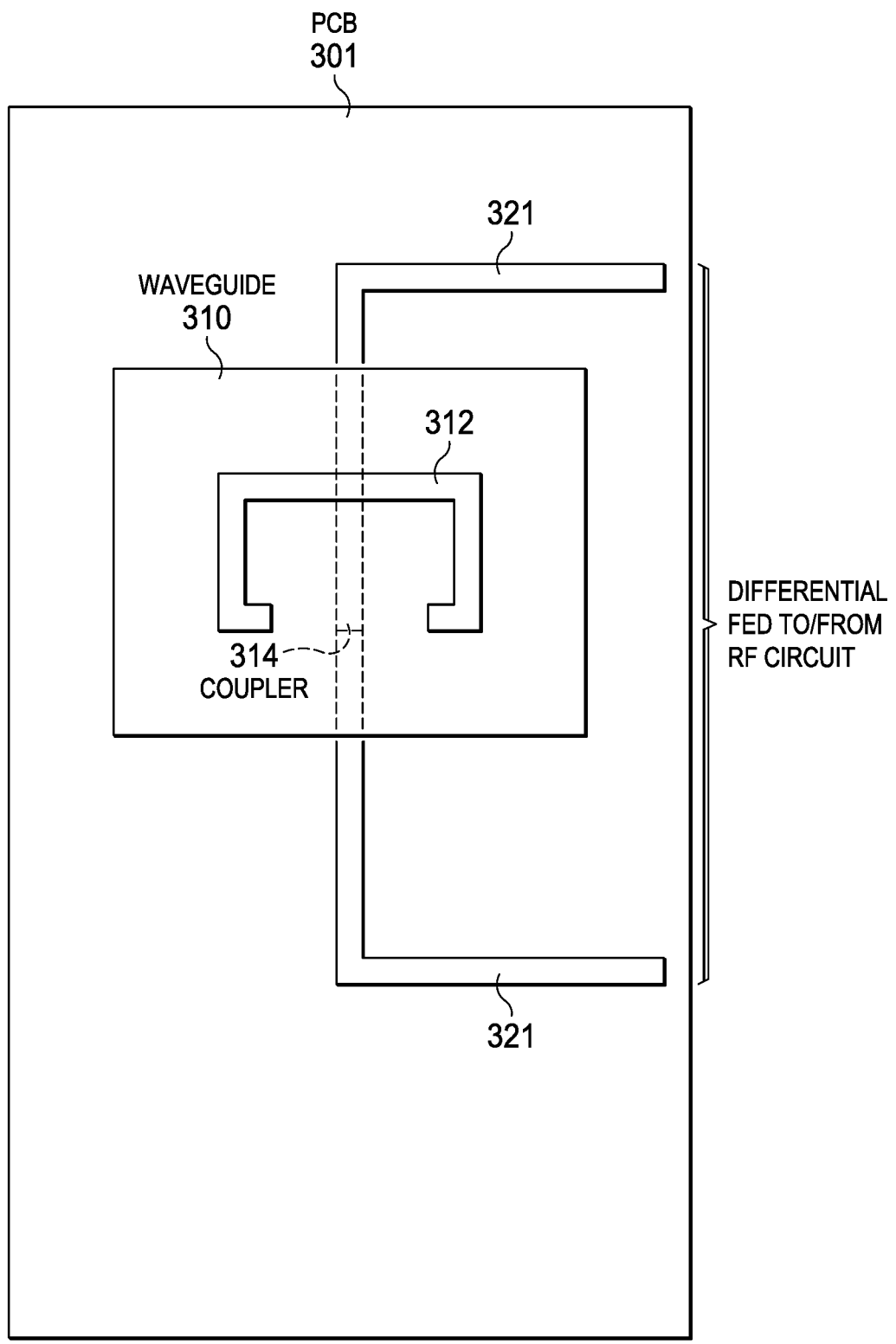

FIGS. 3A-3C, 4 illustrate an exemplary coupler and resonator placed in the waveguides of FIGS. 1-2 in more detail. FIG. 3B is an end view looking into waveguide 310 through substrate 301. The description here may be applied to both of waveguides 110, 111 in FIG. 1-2. FIG. 3A illustrates an example IC 320 that may contain RF circuitry that is connected to waveguide coupler 314. IC 320 may include receiver circuitry for processing an RF signal received on coupler 314 via waveguide 310 or transmitter circuitry for producing an RF signal that is transmitted by coupler 314 into waveguide 310. In some embodiments, IC 320 may contain both transmitter circuitry and receiver circuitry, for example.

Figure 3C:
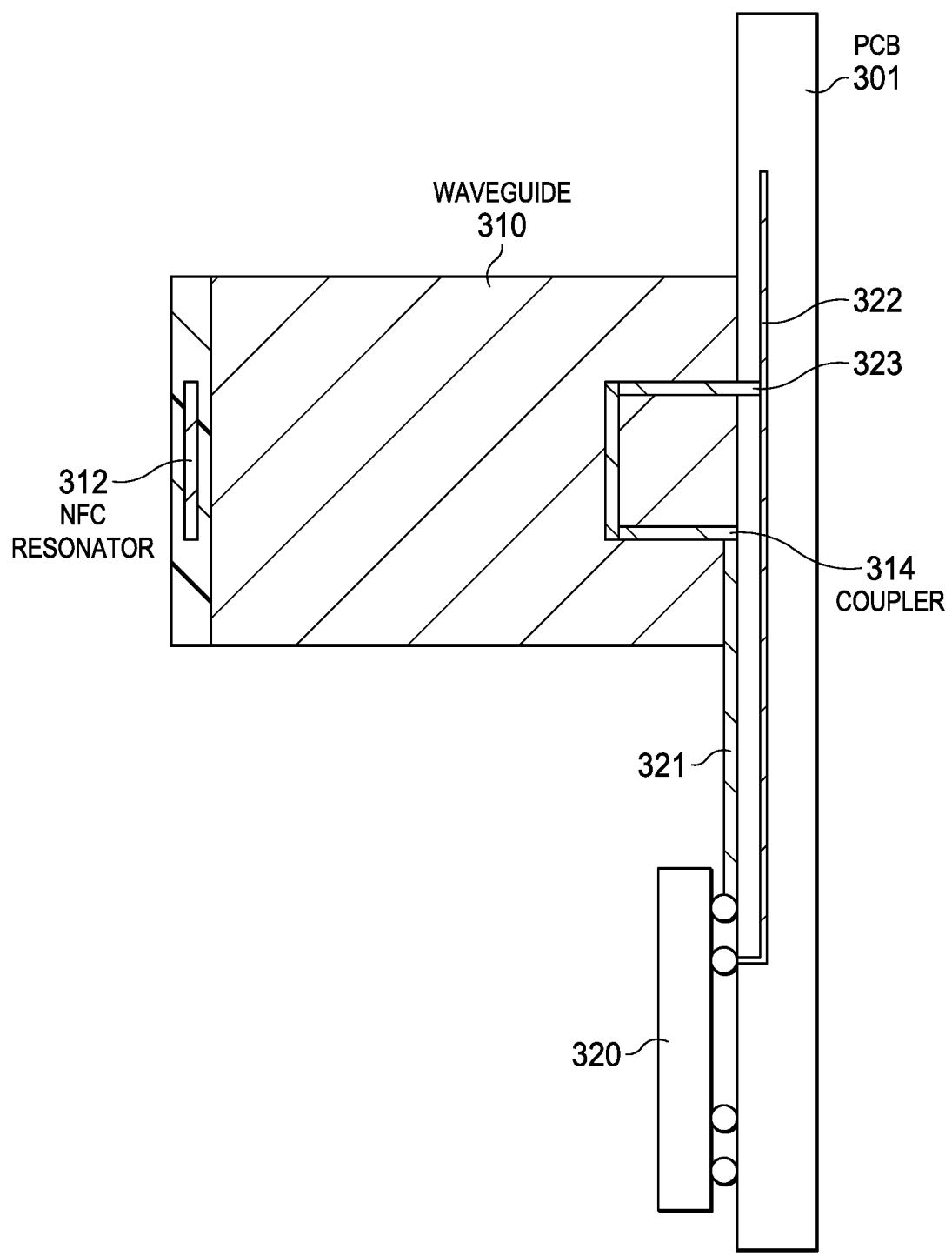

Coupler 314 may be a discrete loop that is soldered to substrate 301, for example. Coupler 314 may be a differential loop which has a microstrip 321 on each side to feed it differentially, as illustrated in FIG. 3B. In FIG. 3A, copper trace 321 is configured as a microstrip over ground plane 322. FIG. 3C illustrates another implementation in which one side of the loop 314 may be shorted 323 to ground for a single-ended feed.

Referring to FIG. 3B, resonator 312 is essentially an open loop that is configured to interact with a propagating wave on the waveguide to which it is mounted. Resonator 312 may be fabricated on a single layer substrate and attached to the end of waveguide 310, for example, using known or later developed techniques, such as: an adhesive, by soldering mounting pads on the substrate to the metal waveguide, etc. In some embodiments, waveguide 310 may have a dielectric core. In this case, resonator 312 may be formed on the end of the dielectric core using an additive process, such as inkjet printing using conductive ink. In another embodiment, resonator 312 may be mounted on a dielectric such as dielectric 103 (referring again to FIG. 1) that is adjacent to the end of waveguide 310.

Figure 4:
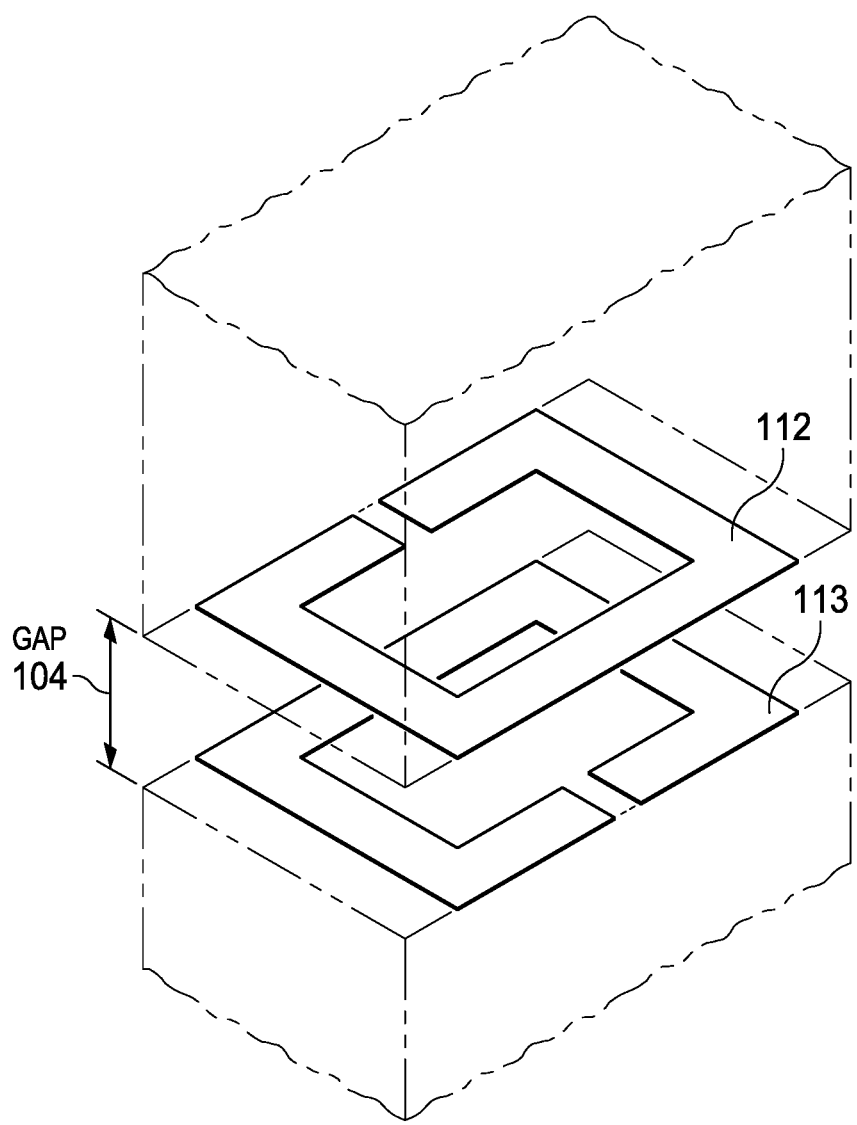

FIG. 4 is an isometric view of coupler 112 and 113 illustrating how the couplers may be oriented with respect to each other and spaced apart by gap 104.

Figure 5:
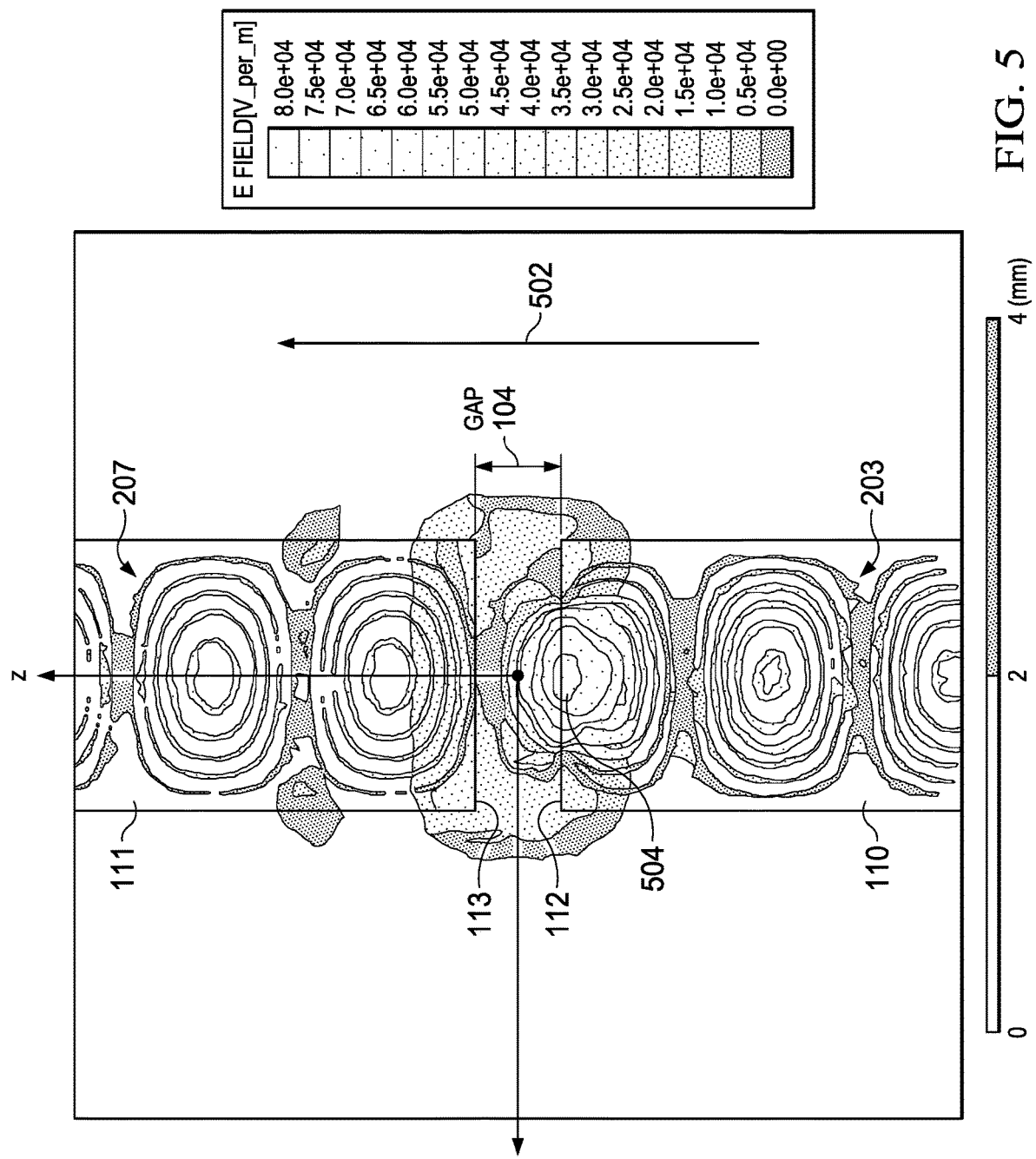
FIGS. 5-7 are plots illustrating simulated operation of the system of FIGS. 1-2.

FIG. 5 is a filed strength plot illustrating simulated operation of the system of FIGS. 1-2. In this example, E-field 203 is propagating through waveguide 110 in a direction indicated by vector 502. When E-field 203 encounters resonator 112, a strong confined near field mode magnetic field is produced that magnetically couples across gap 104 to resonator 113 without significant loss or radiation to nearby systems/components. The confined field acts as an evanescent field that does not radiate.

Figure 6:
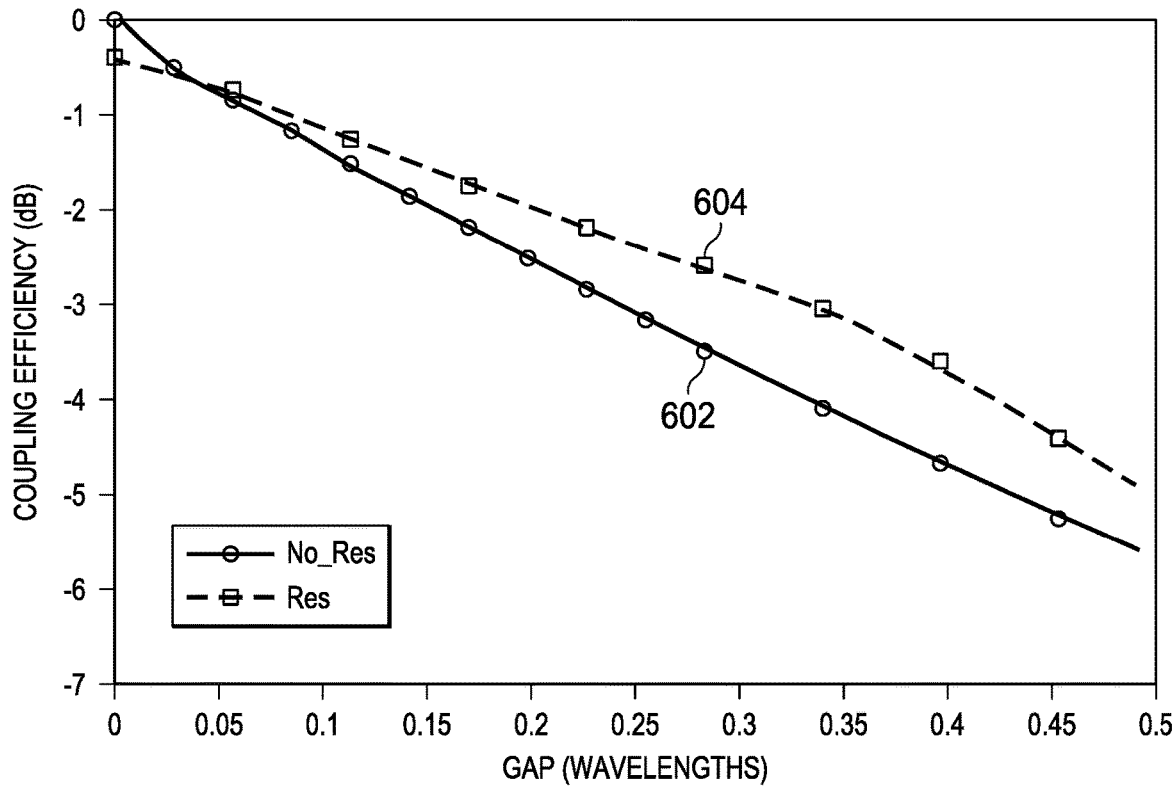

FIG. 6 is a plot illustrating coupling efficiency versus gap distance, measured in the wavelength of the propagating signal. Plot line 602 illustrates a system without resonators, while plot line 604 illustrates operation of a system with resonators placed at the ends of the waveguides on either side of a gap. An efficiency improvement of approximately 1 dB may be observed for a gap of 0.35 wavelength with the use of resonators, for example. As described above, for a frequency of 100 GHz, the wavelength is approximately 1.7 mm in a material with a dielectric constant of 3.

Figure 7:
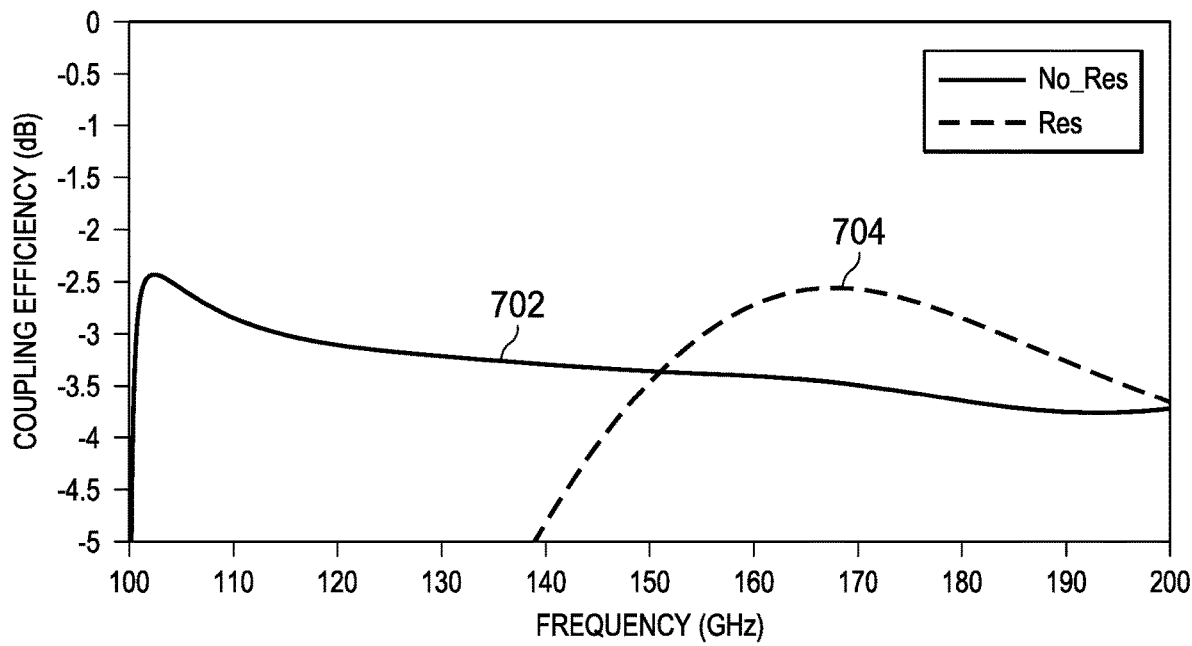

FIG. 7 is a plot illustrating coupling efficiency versus frequency. Plot line 702 illustrates a system without resonators, while plot line 704 illustrates operation of a system with resonators placed at the ends of the waveguides on either side of a gap. In this example, the waveguide is configured to have propagation mode 1 starting at 100 GHz, and propagation mode 2 starting at 200 GHz. In this case, coupled resonators inserted into the gap are designed to have a limited bandwidth and may increase the coupling efficiency over a selected band of frequencies.

In another embodiment, several resonators tuned for different ranges of frequencies may be inserted to increase the bandwidth. In another embodiment, wide band resonators may be used to increase the bandwidth.

Figure 8:
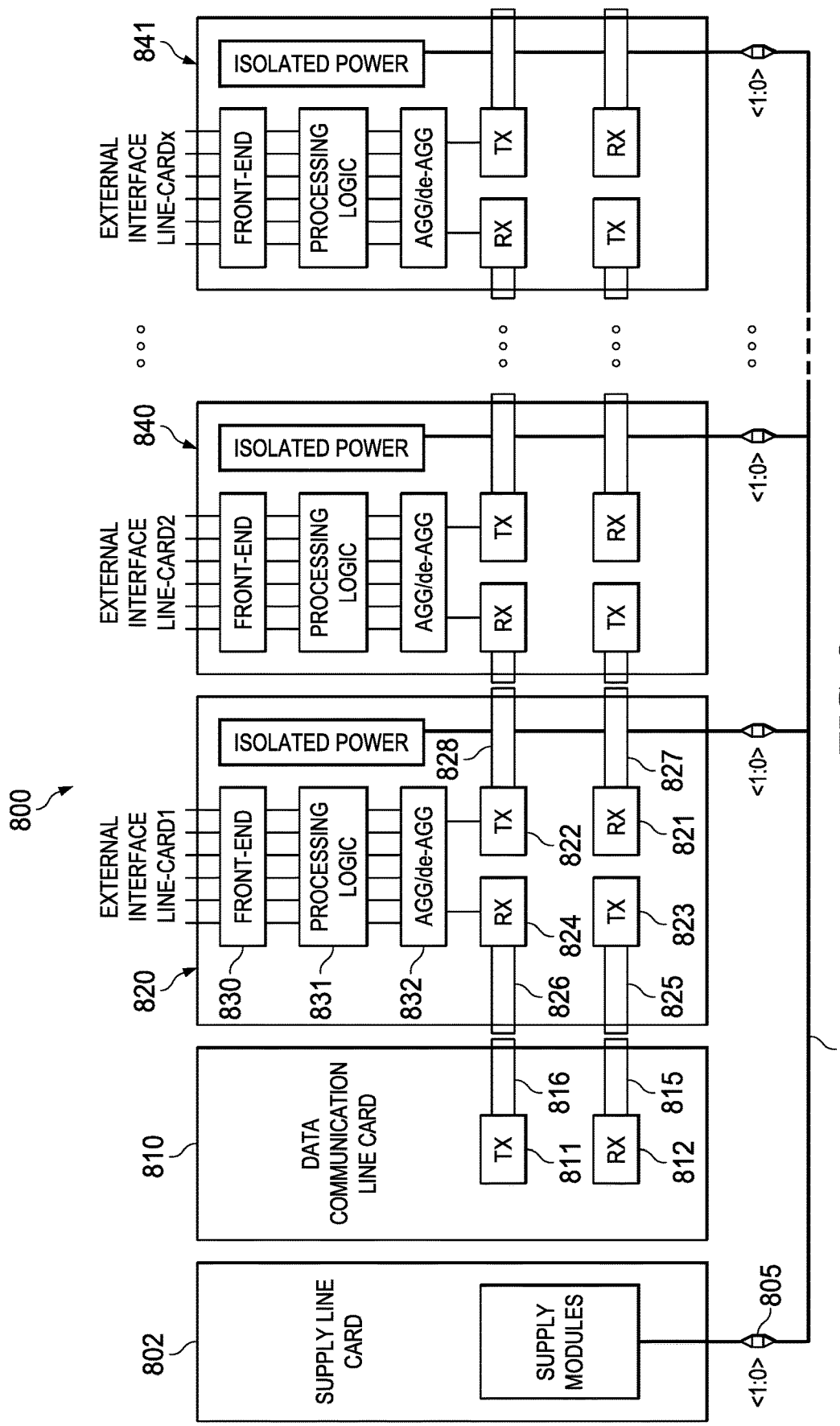
FIG. 8 is a block diagram of an example system that uses waveguides with resonators for NFC communication between modules.

FIG. 8 is a block diagram of an exemplary system that uses waveguides with resonators for NFC communication between modules. System 800 is an example programmable logic controller that uses guided NFC communication between modules. A programmable logic controller (PLC), or programmable controller, is a digital computer used for automation of typically industrial electromechanical processes, such as control of machinery on factory assembly lines, amusement rides, light fixtures, etc. PLCs are used in many machines, in many industries. PLCs are designed for multiple arrangements of digital and analog inputs and outputs, extended temperature ranges, immunity to electrical noise, and resistance to vibration and impact. Programs to control machine operation are usually stored in battery-backed-up or non-volatile memory. A PLC is an example of a "hard" real-time system since output results must be produced in response to input conditions within a limited time, otherwise unintended operation will result. PLC systems are well known and need not be described in detail herein; e.g. see: "Programmable Logic Controller", Wikipedia, as of Dec. 1, 2015, which is incorporated by reference herein.

In this example, several modules are referred to as "line cards". Various types of line cards may be installed in a chassis or rack and configured for various purposes, such as: to control manufacturing processes, to control the heating and cooling in a building, to control medical equipment, etc. As such, electrical isolation is often needed or desirable to prevent ground loops or other interactions between various pieces of equipment that are being controlled. In the past, various types of isolation devices have been used, such as: optical isolators, transformers, etc.

In this example, there is a power supply line card 802, a data communication line card 810, and several processing line cards 820, 840, 841. While five line card modules are illustrated in FIG. 8, an example chassis may accommodate ten or more modules. While a system using line cards is illustrated herein, embodiments are not limited to line cards. Various types of modules may make use of the communication techniques explained herein in order to provide reliable communication between removable modules.

In this example, supply line card 802 is coupled to a source of power and in-turn may produce one or more voltages that may be distributed via a bus 804 that may be coupled to each of the line cards via connectors such as connector 805. Usually, voltage bus(es) 804 may be included in a backplane that provides support for the connectors 805.

Data communication line card 810 may be configured to send and receive data via a communication channel to a remote host or another rack or chassis, for example. Various types of communication line card 810 may accommodate a wireless or wired interface. For example, an internet connection to a local or a wide area net may be provided by line card 810. Alternatively, a wireless connection to a Wi-Fi network or to a cellular network may be provided by line card 810.

Processing line card 820 may include, front end interface logic 830, processing logic 831, and aggregator logic 832, for example. Front end interface logic 830 may be of various types to provide interconnection to equipment that is being controlled, such as: input and output signals, RS232/422/485 compatible signals, digital signals, analog signals, etc. Various types of logic may be provided, such as: analog to digital converters (ADC), digital to analog converters (DAC), relays, contacts, etc. Processing logic 831 may include various types of hardwired and programmable logic, microcontrollers, microprocessors, memory, etc. Line cards 840, 841, etc may be identical or similar to line card 820 and may include various types and combinations of processing and interface logic as needed for a given control task.

In this example, each line card is configured to allow it to communicate with its nearest neighbor on both sides. For example, line card 810 may transmit via transmitter 811 to line card 820 which has a receiver 824. Similarly, line card 820 may transmit via transmitter 823 to receiver 815 on line card 810. At the same time, line card 820 may transmit via transmitter 822 to adjacent line card 840 and receive via receiver 821 from adjacent line card 840.

In a similar manner, each line card in system 800 may communicate with each other line card in a daisy chain manner. Each line card includes an aggregator/de-aggregator logic function, such as 832 on line card 820, that allows each line card to recognize communication on the daisy chain intended for it. The aggregator/de-aggregator function also allows a line card to originate a communication packet that is then provided to the daisy chain and then propagated through adjacent line cards to a final destination on a target line card. In this embodiment, the daisy chain operates in a similar manner to an internet network protocol and each aggregator 832 functions as an internet interface. In another embodiment, a different type of known or later developed peer to peer protocol may be used.

As mentioned above, NFC may be used as the transport vehicle to communicate between each adjacent line card. As described in more detail below, waveguide segments, such as waveguide 815, 825 and 816, 826 may be used to guide the NFC between each adjacent line card module in order to minimize signal spreading and interface to other systems and devices.

Figure 9:
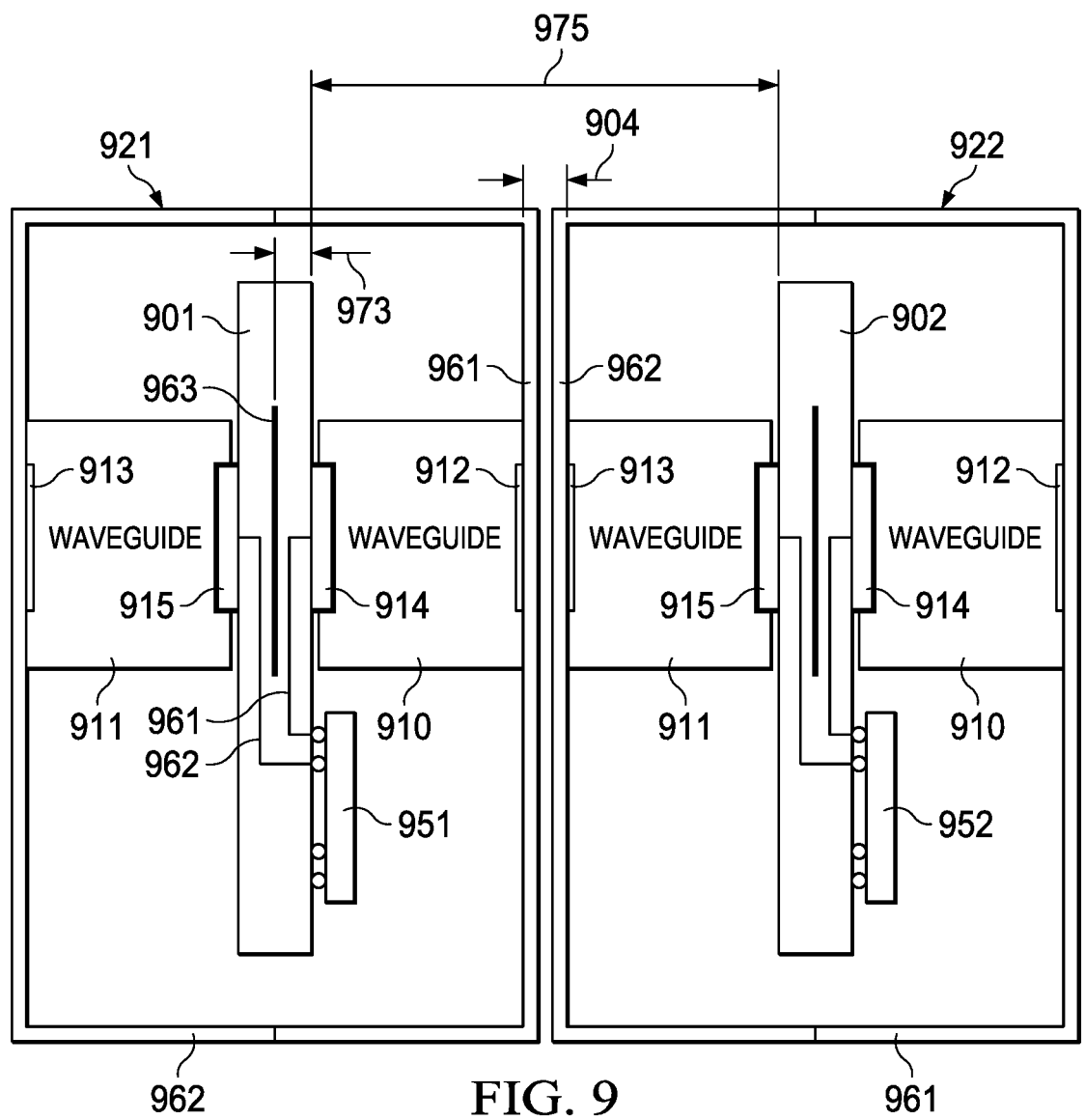
FIG. 9 is a more detailed illustration of modules for the system of FIG. 8.

FIG. 9 is a more detailed illustration of modules for the system of FIG. 8. FIG. 9 illustrates two example line card modules 921, 922 that are representative of the various modules 810, 820, 840, etc of system 800. Module 921 may include a substrate 901 on which are mounted various circuit components, such as an integrated circuit (IC) 951 that includes transmitter(s) and receivers(s), such as transmitter 823 and receiver 824 and/or transmitter 822 and receiver 821, of line card 820. In some embodiments, there may be a separate IC for each transmitter and receiver. In another embodiment, one or more receivers and transmitters may be formed in a single IC, for example. Similarly, module 922 may include substrate 902 on which are mounted various circuit components, such as an integrated circuit (IC) 952 that includes transmitter(s) and receivers(s).

Integrated circuits 951, 952 may also include aggregation logic, processing logic and front end logic, or there may be additional ICs mounted on substrate 901, 902 that contain aggregation logic, processing logic, and front end logic. Substrate 901 may be a single or a multilayer printed circuit board, for example. IC 951 and other ICs may be mounted on substrate 901 using through hole or surface mount technology using solder bumps or bonding depending on the frequency of operation, or other known or later developed packaging technologies. Substrate 901, 902 may be any commonly used or later developed material used for electronic systems and packages, such as: fiberglass, plastic, silicon, ceramic, Plexiglas, etc.

Substrates 901, 902 may also contain a waveguide (WG) coupler 914 that is connected to the receiver and/or transmitter that is contained within IC 951. WG coupler 915 may also be coupled to the receiver and/or transmitter that are contained within IC 951, 952. WG coupler 914, 915 may be similar to couplers 314, referring back to FIGS. 3A-3B. The couplers may be separate structures that are mounted on substrate 901, or they may be embedded within substrate 901.

A waveguide 910 may be mounted in a position that places it approximately centered over WG coupler 914. Similarly, a waveguide 911 may be mounted in a position that places it approximately centered over WG coupler 915. In this manner, a majority of the electromagnetic energy that is emanated by WG coupler 914 will be captured and confined by waveguide 910 and thereby directed to an adjacent module with minimal external radiation and signal loss.

As described in more detail above, a resonator may be fitted in the end of waveguides 910, 911 in order to convert a propagating wave in each waveguide to/from a confined near field mode evanescent magnetic field around the resonator to allow NFC across gap distance 904. Embodiments may operate in near field mode in which the separation between adjacent modules is a fraction of the wavelength of the frequency being transmitted by the transmitter(s) in IC 951. For example, transmission frequencies in a range of 100 GHz to 200 GHz may be used. However, some embodiments may use frequencies that are higher or lower than this range. A 100 GHz signal will have a wavelength of approximately 3 mm in air.

A shield 963 may be provided between left WG coupler 915 and right WG coupler 914 to minimize "back scatter" of the field produced by each WG coupler. Shield 963 may be a conductive layer, for example, that is connected to a ground reference for the module. Shield 963 is spaced apart from each coupler 914, 915 by a distance greater than lambda/10, where lambda is the wavelength of the signal being emitted by the couplers, in order to avoid capacitance effects that may reduce the bandwidth of the coupler. For example, the wavelength of a 30 GHz signal in a dielectric having an $\varepsilon_R$ of 1 is approximately 10.0 mm. In this example, substrate 901 is a typical PWB material that has an $\varepsilon_R$ of approximately 1.0. Therefore, as long as the shield is spaced away from each coupler by a distance 973 of at least 1 mm, then capacitance effects should be minimized in a system operating at 30 GHz. Lower frequency operation may require larger spacing.

Near field mode may produce an evanescent field that may be used to couple two adjacent resonators 912, 913. Evanescent fields by nature exhibit an exponential decay with distance away from the source. By virtue of near proximity between resonator 912 of module 921 and another resonator 913 in an adjacent module 922 that is only a few mm's away, a reasonable TX-to-RX signal coupling may be achieved using the evanescent field in near field mode while mitigating emission limits/concerns outlined per FCC Part 15.

The best analogy would be that of a transformer. A strong self-coupling between coils results in reduced leakage to the external world. Furthermore, any leakage may be considered un-intentional. The requirements for un-intentional radiation per FCC is greatly relaxed compared to those for intentional emissions.

Module 921 may be enclosed in a housing that is roughly indicated at 961, 961. One side of the housing is illustrated as panel 961 while the other side as panel 962, which may be metal or plastic, for example. Typically, the housing will be a few mm thick.

Waveguide 910 may be a dielectric block, for example. Electromagnetic wave propagation through the dielectric block may be described by the wave equation, which is derived from Maxwell's equations, and where the wavelength depends upon the structure of the dielectric block, and the material within it (air, plastic, vacuum, etc.), as well as on the frequency of the wave. Waveguide 910, 911 may be able to confine the field emitted by WG coupler by having a permittivity and/or permeability that is significantly greater than surrounding materials and/or air which will significantly reduce the wavelength of the electromagnetic field emitted by WG coupler 914. Similarly, waveguide 910, 911 may be able to confine the field emitted by WG coupler by having a permittivity and/or permeability that is significantly lower than surrounding materials and/or air which will significantly increase the wavelength of the electromagnetic field emitted by WG coupler 914. Alternatively, waveguide 910, 911 may be constructed from a metamaterial that causes a significant reduction or increase in wavelength of the electromagnetic field emitted by WG coupler 914.

For example, waveguide 910, 911 may be a dielectric block that has a relative permittivity greater than approximately 2.0. Similarly, waveguide 910, 911 may be a dielectric block that has a relative permeability less than approximately 2.0.

In another embodiment, dielectric waveguide 910 may have a conductive layer around the periphery to further confine and direct an electromagnetic field radiated by WG coupler 914. The conductive layer may use a metallic or non-metallic conductive material to form sidewalls around waveguide 910, 911, such as: metals such as copper, silver, gold, etc., a conductive polymer formed by ionic doping, carbon and graphite based compounds, conductive oxides, etc.

Depending on the material and thickness of module wall 961, waveguide 910 may be simply mounted to be adjacent to an inside surface of module wall 961 such that the radiated signal passes through module wall 961. In some embodiments, a window may be provided in module wall 961 so that an outer surface of waveguide 910 may be positioned flush, slightly indented, or slightly proud of an outside surface of module wall 961, for example. The general location on the surface of the housing where the waveguide is located is referred to herein as a "port".

FIG. 9 also illustrates a portion of a second module 922 that may be located adjacent module 921. Module 922 may have a housing that includes a panel 962, that is referred to as a "left" panel. Module 921 may have a panel 961 that is referred to as a "right" panel. Module 922 may include a substrate 902 that holds various ICs, such as IC 952 that may include a receiver and transmitter, and a WG coupler 914, 915. Module 922 may also include a waveguide 911 that is positioned adjacent left panel 962 and in alignment with WG 910 in module 921.

When module 921 and module 922 are installed in a chassis, right panel 961 will be in close proximity to left panel 962, as indicated at 904. Waveguide 910 of module 921 and waveguide 911 of module 922 are configured so that they are in approximate alignment with each other. In this manner, a signal that is generated by a transmitter in IC 951 may be provided to coupler 914, radiated into waveguide 910 and thereby directed to resonator 912 and then received by resonator 913 of module 922, launched into waveguide 911, received by coupler 914 on substrate 902 and thereby provided to a receiver in IC 952.

Module 921 or 922 may be easily removed from or inserted into a chassis without any wear and tear on contacts that were previously required to communicate signals between modules. Furthermore, NFC using resonators 912, 913 provide complete electrical isolation between module 921 and module 922. An additional isolation mechanism is not required.

Figure 10:
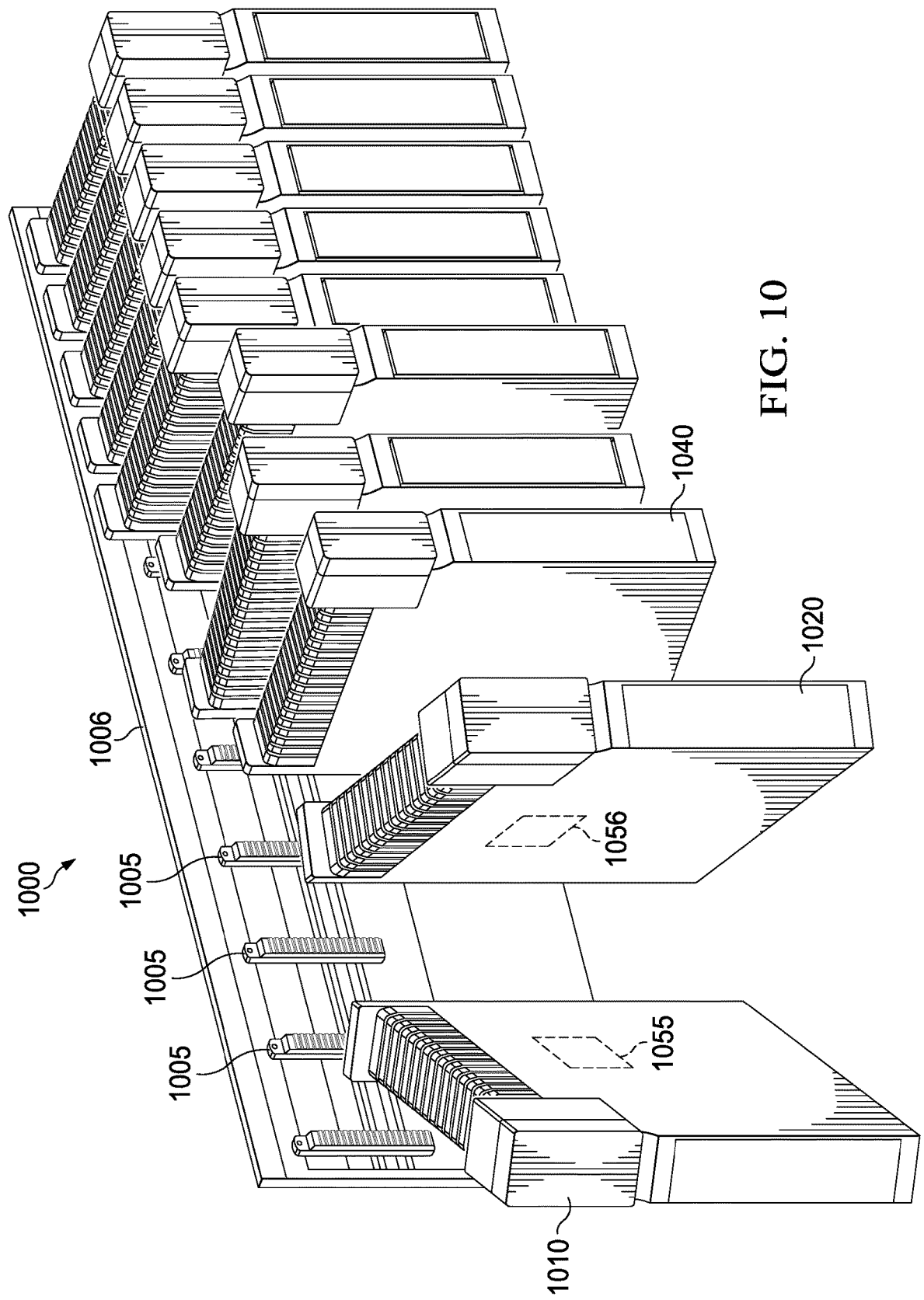
FIG. 10 is a pictorial illustration of the example system of FIG. 8.

FIG. 10 is a pictorial illustration of an exemplary system 1000 that is another view of system 800 of FIG. 8. Backplane 1006 provides a set of connectors 1005 for providing power to each line card, as explained with regard to connector 105 of FIG. 1. As can be seen by the illustration, each line card module is removable from backplane 1006 by simply pulling the module to disconnect it from connector 1005. Usually, a rack or chassis will also be provided along with backplane 1006 to support the line cards when they are inserted into connectors 1005.

Each line card module is enclosed in a housing, which may be made from plastic or other suitable materials. As described in more detail above, each line card may have a WG coupler, waveguide and resonator arranged to form a contactless communication port on each side of the module. For example, module 1010 may have a port 1055 on the right side of the module while module 1020 may have a port 1056 on the left side of the module that aligns with port 1055 when both modules are plugged into backplane 1006.

Similarly, module 1020 may have another port (not shown) on the right side of the module while module 1040 may have a port (not shown) on the left side of the module that aligns when both modules are plugged into backplane 1006. All of the modules may have similar pairs of ports on both sides of each module to allow daisy chained communication among all of the modules, as described in more detail above.

Figure 11:
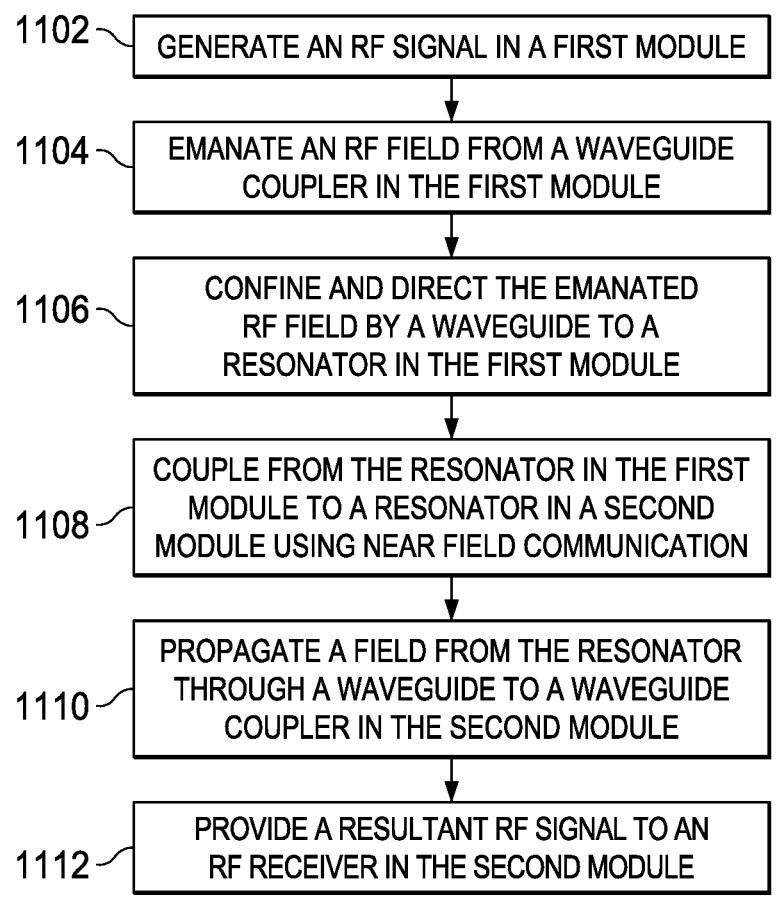
FIG. 11 is a flow chart illustrating operation of near field communication (NFC) between adjacent modules.

FIG. 11 is a flow chart illustrating operation of near field communication between modules, as described above in more detail. As described above in more detail, the modules may be part of a programmable logic control system used for industrial, commercial, and residential applications. An example system may include a rack or chassis into which a set of modules are installed. Each module may communicate with an adjacent neighbor module using near field communication, in which an RF signal generated in one module may be EM coupled to a receiver in an adjacent module using radiative coupling, near field coupling, or evanescent coupling, or any combination of these modes.

For example, a radio frequency (RF) signal may be generated 1102 in a first module. In the example of FIGS. 1-10, the RF signal may have a frequency in the range of 100-200 GHz. However, other systems may use RF signals at a higher or lower frequency by adjusting the physical size of the field coupling and field confining components described herein.

An RF electromagnetic field may be emanated 1104 in response to the RF signal from a first waveguide coupler in the first module. The RF electromagnetic field may be the result of a traveling wave formed in a microstrip loop, for example, as described in more detail with regard to FIGS. 3A-3B.

The emanated RF electromagnetic field is confined and directed 1106 by a waveguide in the first module to a resonator at the end of the waveguide. A confined near field mode magnetic evanescent field may be generated by the resonator in response to the propagating electromagnetic field in the waveguide.

The evanescent field may inductively couple 1108 to a similar resonator located at the end of a waveguide in an adjacent second module. As described in more detail above, the two resonators are located in close proximity when the modules are installed in a system and thereby minimize loss of emanated energy to the surroundings. As described above in more detail, this coupling is performed by EM coupling and may use the near field of the emanated electromagnetic field from the resonator. The coupling may also make use of an evanescent field that is formed by the first WG coupler. There may also be some portion of the propagating field from the waveguide in the first module that radiates across the gap between modules. Depending on the spacing between the adjacent modules, one or the other or a combination of these coupling modes may occur. This may simplify the process of complying with FCC emission requirements, for example.

The emanated RF electromagnetic field is then propagated 1110 to a second WG coupler in the second module.

A resultant RF signal may then be provided 1112 to an RF receiver on the second module. As described above in more detail, the multiple modules in the system may communicate in a daisy chained manner such that any module may be able to communicate with any other module in the system.

A known standard communication protocol, such as the Internet Protocol (IP) may be used, treating the daisy chained NFC physical media as an Ethernet. The Internet Protocol (IP) is the principal communications protocol in the Internet protocol suite for relaying datagrams across network boundaries. IP has the task of delivering packets from the source host to the destination host solely based on the IP addresses in the packet headers. For this purpose, IP defines packet structures that encapsulate the data to be delivered. It also defines addressing methods that are used to label the datagram with source and destination information. The first major version of IP, Internet Protocol Version 4 (IPv4), is the dominant protocol of the Internet. Its successor is Internet Protocol Version 6 (IPv6).

Another embodiment may use another known or later developed communication protocol for communication using the daisy chained NFC physical media as described herein.

In this manner, embodiments may provide high throughput communication between removable modules of a system using near field communication techniques. The techniques described herein may be less expensive than alternatives, such as optical couplers. NFC allows contactless communication between modules and thereby eliminates the need for additional isolation in systems that may require isolation between modules.

Figure 12:
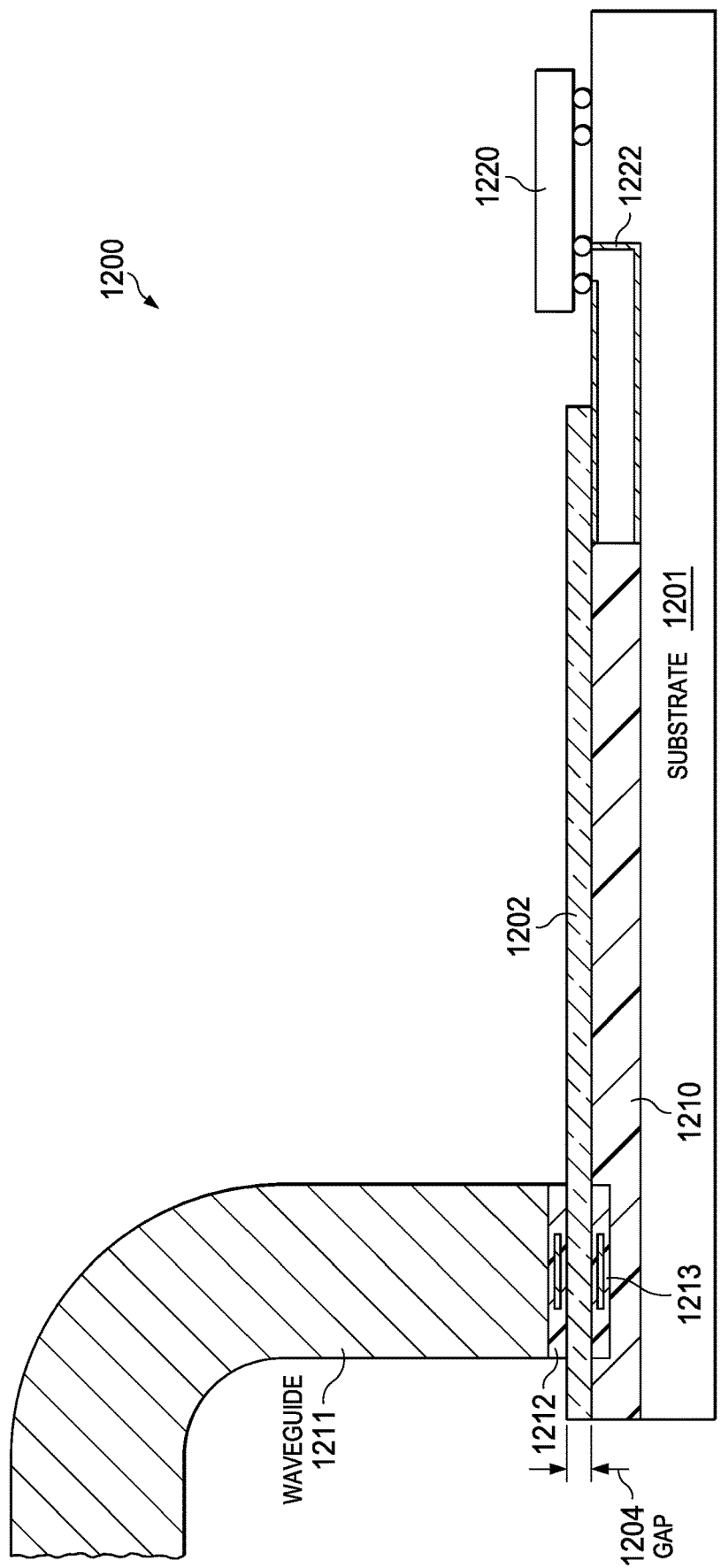
FIG. 12 is a cross sectional view of another embodiment of a system using near field coupling across a gap.

FIG. 12 is a cross sectional view of another embodiment of a portion of a system 1200 using near field coupling across a gap 1204. In this example, a substrate 1201 has a waveguide 1210 formed within the substrate. Substrate 1201 may be a printed circuit board (PCB) implemented using any commonly used or later developed material used for electronic systems and packages, such as: fiberglass, plastic, silicon, ceramic, Plexiglas, etc. An integrated circuit 1220 may be mounted on substrate 1201 and be coupled to waveguide 1210 using a coupler similar to coupler 314 as illustrated in FIG. 3A, for example. Other examples of waveguides formed in a substrate and coupled to an IC are described in U.S. Pat. No. 9,306,263, "Interface Between an Integrated Circuit and a Dielectric Waveguide Using a Dipole Antenna and a Reflector", Juan Herbsommer et al. and is incorporated by reference herein.

A second waveguide 1211 may be configured to interface to waveguide 1210. As described above in more detail, a resonator 1212 placed in the end of waveguide 1211 and an adjacent resonator placed in an end of waveguide 1210 may improve coupling efficiency across gap 1204. In this example, an insulating or dielectric layer 1202 may be formed over a portion or over the entirety of substrate 1201. Layer 1202 may be formed from various materials, such as: silicon dioxide, glass, quartz, ceramic, plastic, etc.

Figure 13:
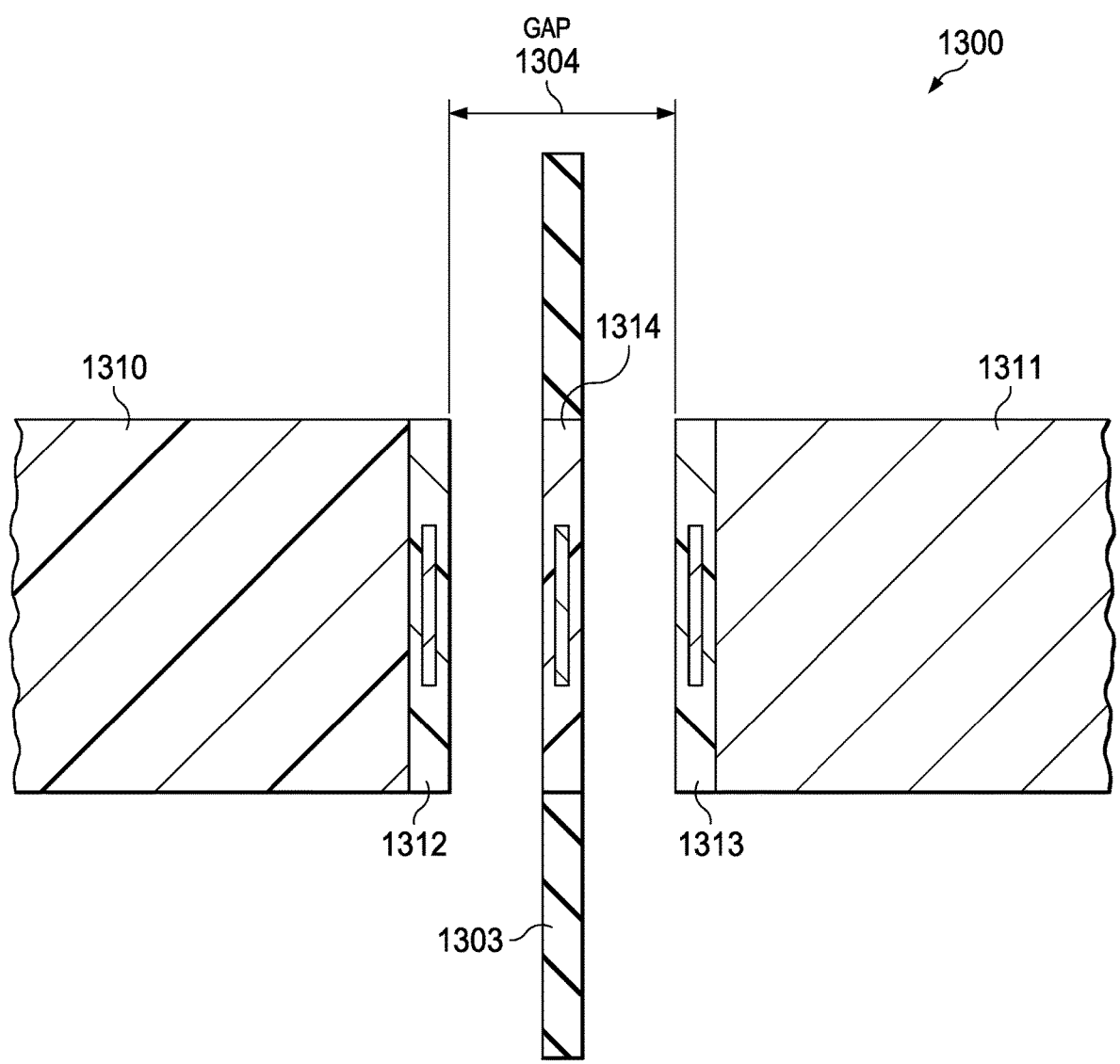
FIGS. 13-15 illustrate other embodiments of systems using resonators to improve coupling efficiency of NFC across a gap between waveguides.

FIG. 13 illustrates a portion of a system 1300 with multiple resonators used for larger gaps. In this example, waveguides 1310, 1311 are separated by a larger gap 1304. As described above in more detail, resonators 1312, 1313 may be placed in the ends of waveguides 1310, 1311 in order to improve coupling efficiency across gap 1304. However, referring back to FIG. 6, coupling efficiency decreases as the gap gets wider. Beyond approximately a half wavelength gap the efficiency may be too low for good results.

Installing one or more resonators 1314 spaced across a gap may allow the effective length of the gap between each pair of resonators to be maintained below approximately 0.5 wavelength, for example.

Figure 14:
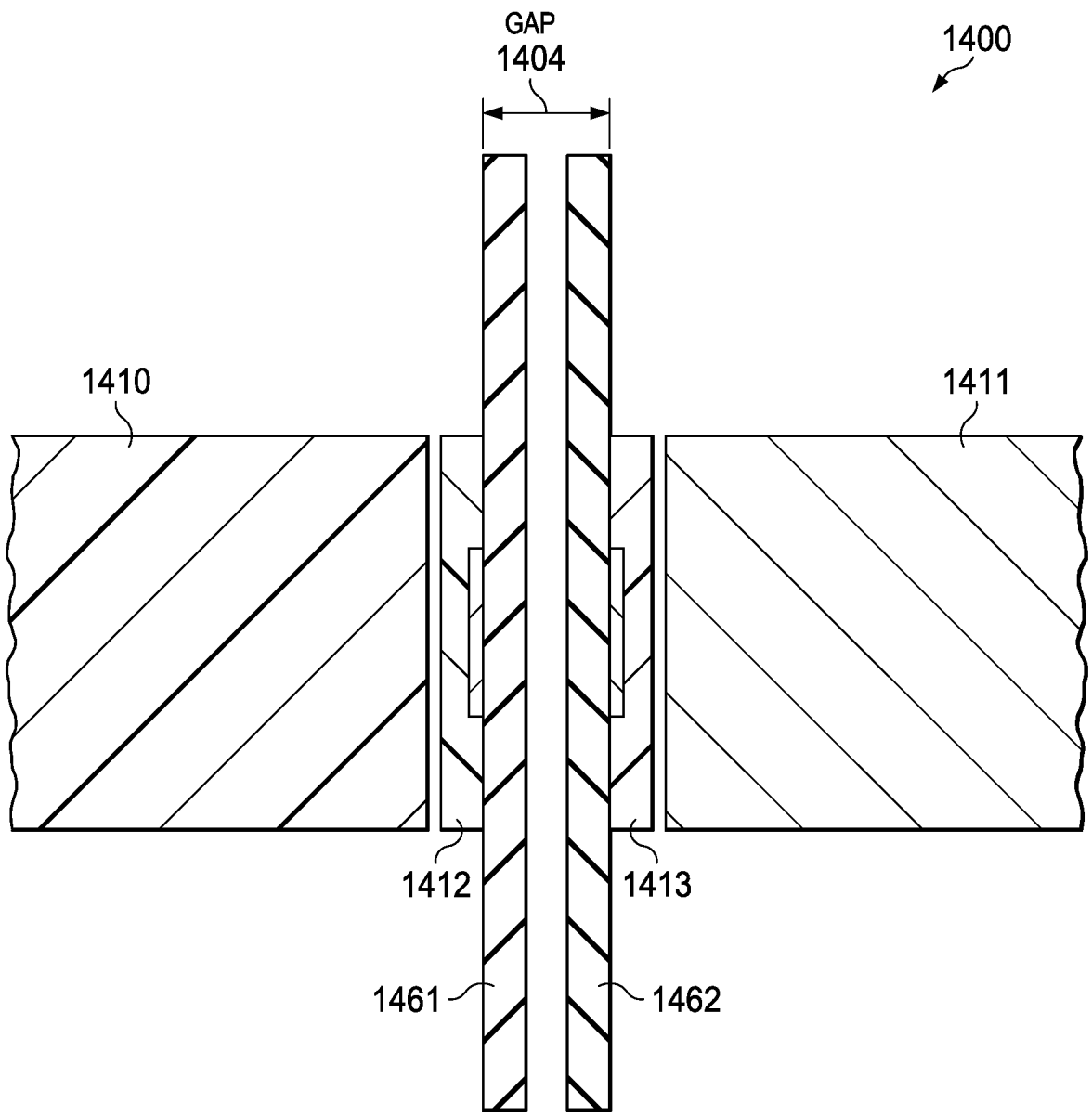

FIG. 14 illustrates a portion of a system 1400 in which resonators are mounted on a dielectric adjacent the end of a waveguide 1410, 1411. As described above in more detail, resonators 1412, 1413 may improve coupling efficiency across gap 1404. In this example, resonators 1412, 1413 may be applied to a surface of a dielectric 1461, 1462 that is forming all or a portion of the gap. For example, referring back to FIG. 9, dielectric 1461 may represent the right panel 961 of a module while dielectric 1462 may represent a left panel 962 of a module. In this manner, waveguides 1410, 1411 may be simple waveguides that are positioned adjacent resonators 1412, 1413 when each module is assembled.

Figure 15:
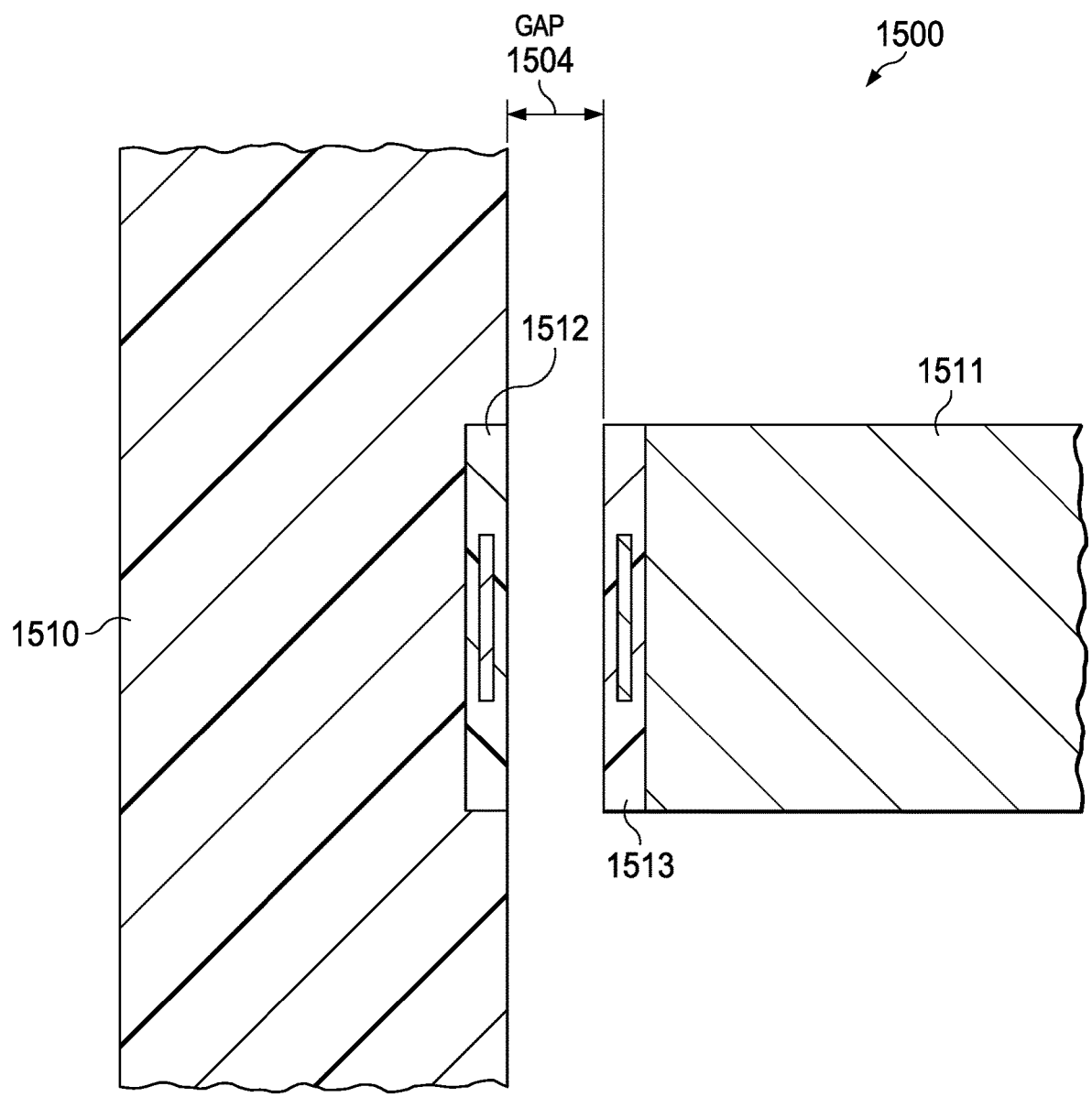

FIG. 15 illustrates a portion of a system 1500 in which waveguide 1510 and waveguide 1511 form a "T" intersection with a gap 1504 between them. In this example, resonators 1512, 1513 may be installed in the waveguides to improve efficiency of coupling across gap 1504. In other embodiments, other intersection configurations may also be improved with resonators, such as: a 90 degree bend intersection, a 45 degree bend intersection, etc.

Other Embodiments

A programmable logic controller system is described herein, but other types of modular systems may embody aspects of this description to improve reliability.

While modules in which the guided NFC ports are located on the side of the module were described herein, in another embodiment a port may be located on an edge of a module with a mating port located on a backplane or other surface that is adjacent to the edge of the module, for example.

While a daisy-chained communication configuration was described herein, in another embodiment other topologies may be formed. For example, a tree topology may be formed by providing a port on the backplane that mates with an edge mounted port in each module.

While a simple dielectric block has been described herein, another embodiment may use a metallic or non-metallic conductive material to form sidewalls on the waveguide field confiner, such as: a conductive polymer formed by ionic doping, carbon and graphite based compounds, conductive oxides, etc.

A dielectric or metamaterial waveguide field confiner may be fabricated onto a surface of a substrate or module panel using an inkjet printing process or other 3D printing process, for example.

While dielectric waveguide field confiners with polymer dielectric cores have been described herein, other embodiments may use other materials for the dielectric core, such as ceramics, glass, etc.

While waveguides with a rectangular cross section are described herein, other embodiments may be easily implemented. For example, the waveguide may have a cross section that is square, trapezoidal, cylindrical, oval, or many other selected geometries.

The dielectric core of a conductive waveguide may be selected from a range of approximately 2.4-12, for example. These values are for commonly available polymer dielectric materials. Dielectric materials having higher or lower values may be used when they become available.

While sub-terahertz signals in the range of 100-200 GHz are described herein, WG couplers, waveguides with resonators and systems for distributing higher or lower frequency signals may be implemented using the principles described herein by adjusting the physical size of the waveguide and resonator accordingly.

In this description, the term "couple" and derivatives thereof mean an indirect, direct, optical, and/or wireless electrical connection. Thus, if a first device couples to a second device, that connection may be through a direct electrical connection, through an indirect electrical connection via other devices and connections, through an optical electrical connection, and/or through a wireless electrical connection.

Although method steps may be presented and described herein in a sequential fashion, one or more of the steps shown and described may be omitted, repeated, performed concurrently, and/or performed in a different order than the order shown in the drawings and/or described herein. Accordingly, embodiments are not limited to the specific ordering of steps shown in the drawings and/or described herein.

Modifications are possible in the described embodiments, and other embodiments are possible, within the scope of the claims.

What is claimed is:

1. A system comprising:
   a module including:
   a substrate;
   a waveguide coupler on the substrate;
   a radio frequency (RF) transmitter or receiver on the substrate, the RF transmitter or receiver coupled to the waveguide coupler;
   a housing surrounding and enclosing the substrate, the housing having a surface and a port region on the surface;
   a waveguide between the waveguide coupler and the port region; and
   a resonator adjacent to an end of the waveguide at the port region, in which the resonator is attached to an inside of a wall of the housing at the port region.

2. A system comprising:
   a backplane;
   a first module attached to the backplane, the first module including:
   a substrate;
   a waveguide coupler on the substrate;
   a radio frequency (RF) transmitter or receiver on the substrate, the RF transmitter or receiver coupled to the waveguide coupler;
   a housing surrounding and enclosing the substrate, the housing having a surface and a port region on the surface;
   a waveguide between the waveguide coupler and the port region; and
   a resonator adjacent to an end of the waveguide at the port region; and
   a second module attached to the backplane and adjacent the first module, in which each of the first and second modules has a respective first port and a respective second port, and the first port of the first module aligns with the second port of the second module.

3. A system comprising:
   a module including:
   a substrate;
   a first waveguide coupler on the substrate;
   a second waveguide coupler on the substrate;
   a radio frequency (RF) transmitter on the substrate, the RF transmitter coupled to the first waveguide coupler;
   an RF receiver on the substrate, the RF receiver coupled to the second waveguide coupler;
   a housing surrounding and enclosing the substrate, the housing having a surface and first and second port regions on the surface;
   a first waveguide between the first waveguide coupler and the first port region;
   a second waveguide between the second waveguide coupler and the second port region;
   a first resonator adjacent to an end of the first waveguide at the first port region; and
   a second resonator adjacent to an end of the second waveguide at the second port region.

4. The system of claim 3, wherein the module is a first module, the housing has opposite first and second sides, the first port region is located on the first side, the second port region is located on the second side, and the first port region is configured to align with a third port region of a second module when the first and second modules are installed adjacent each other in the system.

* * * * *